United States Patent
Berkooz et al.

(10) Patent No.: US 6,799,078 B1
(45) Date of Patent: Sep. 28, 2004

(54) METHOD FOR FINDING OPTIMAL SET-POINTS FOR MACHINES AND PROCESSES

(75) Inventors: Oded Berkooz, Holon (IL); Moshe Evenor, Rishon Le Zion (IL); Robert Landon Roach, Ramat Hasharon (IL)

(73) Assignee: Pronetix, Ltd., Holon (IL)

( * ) Notice: Subject to any disclaimer, the term of this patent is extended or adjusted under 35 U.S.C. 154(b) by 260 days.

(21) Appl. No.: 09/663,332

(22) Filed: Sep. 18, 2000

(30) Foreign Application Priority Data

Feb. 3, 2000 (IL) ................................................ 134380

(51) Int. Cl.$^7$ ............................................. G05B 13/02
(52) U.S. Cl. ............................ 700/28; 700/29; 700/30; 700/31; 700/32; 700/173; 700/174; 700/176; 700/121; 700/266; 702/85; 702/193; 702/194
(58) Field of Search ........................... 700/28–32, 121, 700/266, 173–175, 176; 702/85, 193, 194

(56) References Cited

U.S. PATENT DOCUMENTS 4,577,280 A * 3/1986 Putman ..................... 700/282
5,351,184 A * 9/1994 Lu et al. ...................... 700/45
5,424,962 A * 6/1995 Bouchez et al. ............ 702/181
5,561,599 A * 10/1996 Lu ................................ 700/44
5,566,065 A * 10/1996 Hansen et al. ................ 700/44

* cited by examiner

Primary Examiner—Anthony Knight
Assistant Examiner—Thomas Pham
(74) Attorney, Agent, or Firm—Foley Hoag LLP

(57) ABSTRACT

A controller and method for efficient tracking and optimizing of a machine set-point, to correct for changes in machine characteristics, can include: (a) defining allowed ranges for output product properties and possible machine set-points, and optimal set-point criteria; (b) finding updated constants for the machine model by calibrating the model; (c) using the updated constants to find all set-points providing a product with properties within the allowed ranges; (d) determining an optimized set-point; (e) operating the machine at the optimized set-point, and obtaining a new output product; (f) comparing the properties of the new output product to the allowed ranges; (g) successfully finishing the procedure as finding a new set point if the properties of the output product are within allowed ranges; and, (h) if the properties of the output product are out of said allowed ranges, repeating the procedure from b.

14 Claims, 3 Drawing Sheets

METHOD FOR FINDING OPTIMAL SET-POINTS FOR MACHINES AND PROCESSES

FIELD OF THE INVENTION

The present invention relates to a method for finding an optimal set-point for machines and processes. More particularly, the invention relates to a method for recalibrating the constants of an existing model of a machine and process and for finding optimal set-points for operating with the same. Furthermore, the invention relates to a controller, which utilizes the said method for establishing the optimal set point for a machine.

BACKGROUND OF THE INVENTION

In any manufacturing process, there are process machines which take multiple inputs (such as gases, materials, power, etc.), arrange local environments (such as pressure, temperature, etc.), and change either the shape or some set of properties of the operant material(s). The desired output is a specific arrangement of new properties (e.g., index of refraction, stress, geometry, etc.) on the operant material, and are called herein either the output, the product, or the goal. It is axiomatic that the output goals must be given in terms of acceptable ranges of variations from the desired goal.

In order to predict the output of a machine (hereinafter, whenever the term "machine" is used, it should be understood that it may also refer to a process) for a specific set of inputs, there is a need to provide a model of the machine. The model may consist of a set of smaller models which predict one or more properties of the output.

One common type of a model is the physical model. A physical model comprises a set of mathematical functions and formulas arising from first principle physics that describe the behavior and the operation of the machine. These models often contain some calibration constants which are related to some physical characteristic of the process but for which the first principle knowledge is either limited or lacking. These constants are adjusted to allow the model to properly simulate the process.

Other types of models are data based models (sometimes also referred to in the art as "statistical models") which only try to fit experimental data from the machine. These models are constructed by means of carrying out many experiments and accumulating a large amount of raw data relating to the characteristics of the output product versus different sets of inputs. They are generally used in cases where the physical model is either not known or becomes very complicated and thus it is difficult to evaluate its many constants. These data based models treat the machine as a "black box", and try to predict the properties of the output product versus the inputs, based on experimental results. Thus the constants also allow the model to simulate the process but, unlike the physical model, they are not connected to any physical characteristic. For this reason, physical models are usually more accurate.

The variables of the function(s) of the model (hereinafter, the x's) are the inputs to the machine, which should be determined for any specific output desired. One combination of machine settings for providing a specific output which includes the inputs and environment variables, is called a set-point or set-up. In virtually every industrial application or controller that uses some sort of predictive model, the constants are determined from a data set with the number of set-points equal to or greater than the number of undetermined constants in the model. In some applications, data is abundantly available from continuous input from sensors. In others the data is difficult or expensive to obtain. In such cases, the 'Design of Experiments' (DOE) method of conducting the experiments describes the conditions to obtain the most data from the fewest experiments. Whether the data is abundantly available or a DOE set of experiments is being performed, recalibration of the model requires a complete new data set. In the continuously available data mode, this presents no difficulty. But in the more frequent DOE case, another expensive data set generation is required. A unique feature of the present invention is that only one new data point is required in order to update the model. While the process of the present invention is applicable to both types of data environments, the operation will be described most fully for the latter, more difficult case.

Since the output product must be given in terms of an acceptable range of variation from the desired goal, it also follows that there are many machine set-points that give outputs in the acceptable range. It is therefore desired to find, for each output, a set-point, of the many available, which is optimal in some sense. For example, one criterion could be to find a set-point in which the product is most robust to variations in the inputs. By this it is meant that some of these set-points will cause the characteristics of the output product to be more sensitive to variations in the inputs than the others, as a small change in the input value may cause the product to be out of the acceptable range. It should thus be desirable to choose the set-point for which small variations cause the least change in the output product. Other criteria could include asking for the new set-point to be as close as possible to the last known set point. In the present procedure, virtually any set of criteria or constraints can be applied to select an optimal set-point.

Obviously, there is no model that can stay forever accurate. Any machine changes over time, some of its parts wear out and have to be replaced, other parts may become dirty, and a maintenance procedure has to be carried out from time to time. Thus the constants of the model have to be recalibrated from time to time in order to compensate for any changes.

To do this recalibration, the prior art required a long series of tests to be conducted in order to reevaluate the constants of a model. In any case, the procedures of the prior art for updating the model and finding a new set-point for operating the machine are non-productive, and expensive.

U.S. Pat. No. 5,740,033 discloses a design of an interactive controlling device for a manufacturing process. This patent provides an algorithm for devising the desired set-point or operating conditions of the machine. In particular, the controlling device includes a physical process model and an independent disturbance physical model. An executive sequencer periodically sends recorded data to the process model, which in turn makes predictions as to desired set-points for the machine. This patent uses large data sets that are continuously provided to the inputs by sensors. Furthermore, the interactive controller of this patent is aimed at making dynamic changes in machine settings to control uniformity of product.

U.S. Pat. No. 4,577,280 discloses a control system for distributing a fluid flow. The object of the system in this patent is to optimally distribute a fluid in a steam-generating plant. The system uses an algorithm for predicting the best fluid distributions, in essence, a set-point. However, if the model is changed, and in order to determine a suitable set-point again, a large data set is required, which is difficult and expensive to obtain.

U.S. Pat. No. 4,835,690 discloses an expert system for medical imaging scanning, setting up, and scheduling. This patent relates to standardizing image quality in medical diagnostic imaging. Several machine settings are to be adjusted in order to achieve this end. However, a large data set has to be used in order to compute the constants, and the resulting model can be updated only by means of another complete set.

U.S. Pat. No. 5,774,761 discloses a machine set-up procedure using multivariate modeling and multiobjective optimization. This patent deals mainly with machine settings in electrostatographic printing for controlling image quality. The procedure shows how a model is calibrated and then is used for computing an optimal set of machine settings. The model suitable for this procedure is completely statistical, and the calibration is performed with a large data set in a DOE manner rather than a single point.

It is therefore an object of the present invention to provide in optimal set-point for the machine operation in a fast and easy manner, requiring the least possible number of experiments to achieve the optimal set-point.

It is another object of the invention to provide a method for recalibrating the model of a machine process, when needed.

More particularly, according to the method of the present invention, in most cases carrying out fewer than four tests is sufficient for updating the model, and for finding a new set-points for operating the machine with the updated model.

SUMMARY OF THE INVENTION

The present invention relates to a method for optimizing a machine set-point, which comprises the following steps: (a) Defining allowed ranges for the properties of the output product, the ranges of the possible machine set-points and optimal set-point criteria; (b) Carrying out calibration of the model of the machine for finding updated constants for the machine model; (c) Using the updated constants in the machine model, finding all set-points that will provide a product whose properties are within the allowed ranges; (d) Carrying out an optimization procedure to find from all the set-points found in step c, one optimized set-point; (e) Operating the machine at the optimized set-point found in step d, and obtaining a new output product; (f) Comparing the properties of the new output product to the allowed ranges; (g) If the properties of the output product are within allowed ranges, the new set-point is found, and the procedure is successfully finished; (h) If however the properties of the output product are out allowed ranges, repeating the procedure from step b. according to one embodiment of the invention the calibration of the model comprises: (a) Taking the known model; (b) Substituting for the variables of the known model the latest set-point; (c) Predicting the values of the output properties; (d) Comparing the predicted output properties to the properties of the output product from the machine; (e) Updating the constants of the model to reduce the difference between predicted and measured properties to a negligible level.

According to another embodiment of the invention the calibration of the model comprises: (a) Taking the known model; (b) Providing to the machine an input set-point as calculated from the known model of the machine, for producing the goal product, and receiving an output product; (c) Substituting for the variables of the known model the latest set-point; (d) Predicting the values of the output properties; (e) Comparing the predicted output properties to the properties of the output product from the machine; (f) Updating the constants of the model to reduce the difference between predicted and measured properties to a negligible level.

According to one embodiment of the invention the optimization procedure comprises: (a) Taking the calibrated model; (b) Finding all set-points within the ranges of the possible machine set-points that, when substituted for the variables of the calibrated model, result in a product whose properties are predicted to be within allowed ranges for the properties of the output product; (c) From all the set-points found in step b, finding the optimal one, according to a defined set-point criteria.

Preferably, the optimal set-point criteria is selected from the following (a) Most robust set-point that will provide an output product whose variations with respect to errors in machine settings is minimal; (b) A set-point that is closest to the one used for updating the constants in step b of the main procedure; (c) A set-point whose values are closest to the center of the ranges of the possible machine set-points as defined in step a of the main procedure.

The invention further relates to a method for optimizing machine set-points in a group of machines of same type, which comprises: (a) Finding a new set-point for a first machine in the group, according to the main procedure; (b) Substituting for the variables of the known model the new set-point as found in step a, as the latest set-point for any other machine in the group.

The method of the invention can be used for an efficient tracking and optimizing of new set-points, to correct for changes in machine characteristics.

The method of the invention can be used for predicting a new set-point for correcting any change in the output properties of a product, wherein a latest set-point and one set of the previous product output properties obtained by operating the machine in said latest set-point, is used for obtaining a new set-point.

According to the invention the model can be of any type, including a physical model, a data based model, or a combination thereof.

DETAILED DESCRIPTION OF PREFERRED EMBODIMENTS

Figure 1:
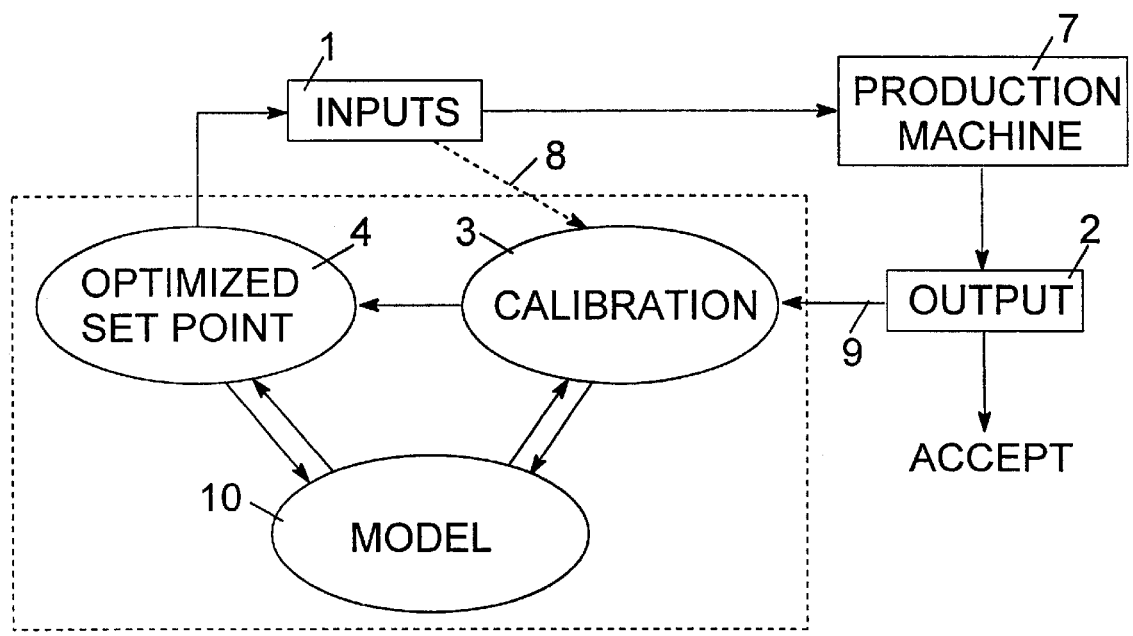
FIG. 1 illustrates the method for recalibrating the model and for finding a new set-point for the machine operation, according to one embodiment of the invention.

FIG. 1 describes in block diagram form the method for recalibrating the model and for finding a new set-point for the machine operation, according to one embodiment of the invention. The procedure goes through the following major steps:

1. A machine is operated once with a given set of inputs, i.e., a Set-Point.
2. The outputs are measured to determine if they are within the acceptable ranges. If so, then the loop ends and the machine can henceforth use the said Set-Point.
3. If the outputs are not within the acceptable ranges, then a calibration step 3 is performed, using the given inputs (dashed arrow 8) and the resulting outputs 9. This step both calls the model 10 and changes the model constants.

4. A new, optimized Set-Point is computed using the model 10.

5. The newly calculated set-point is provided as inputs 1 to the machine, which operates according to said inputs. The procedure returns to step 1 above, operating with said optimized set-point.

Figure 2:
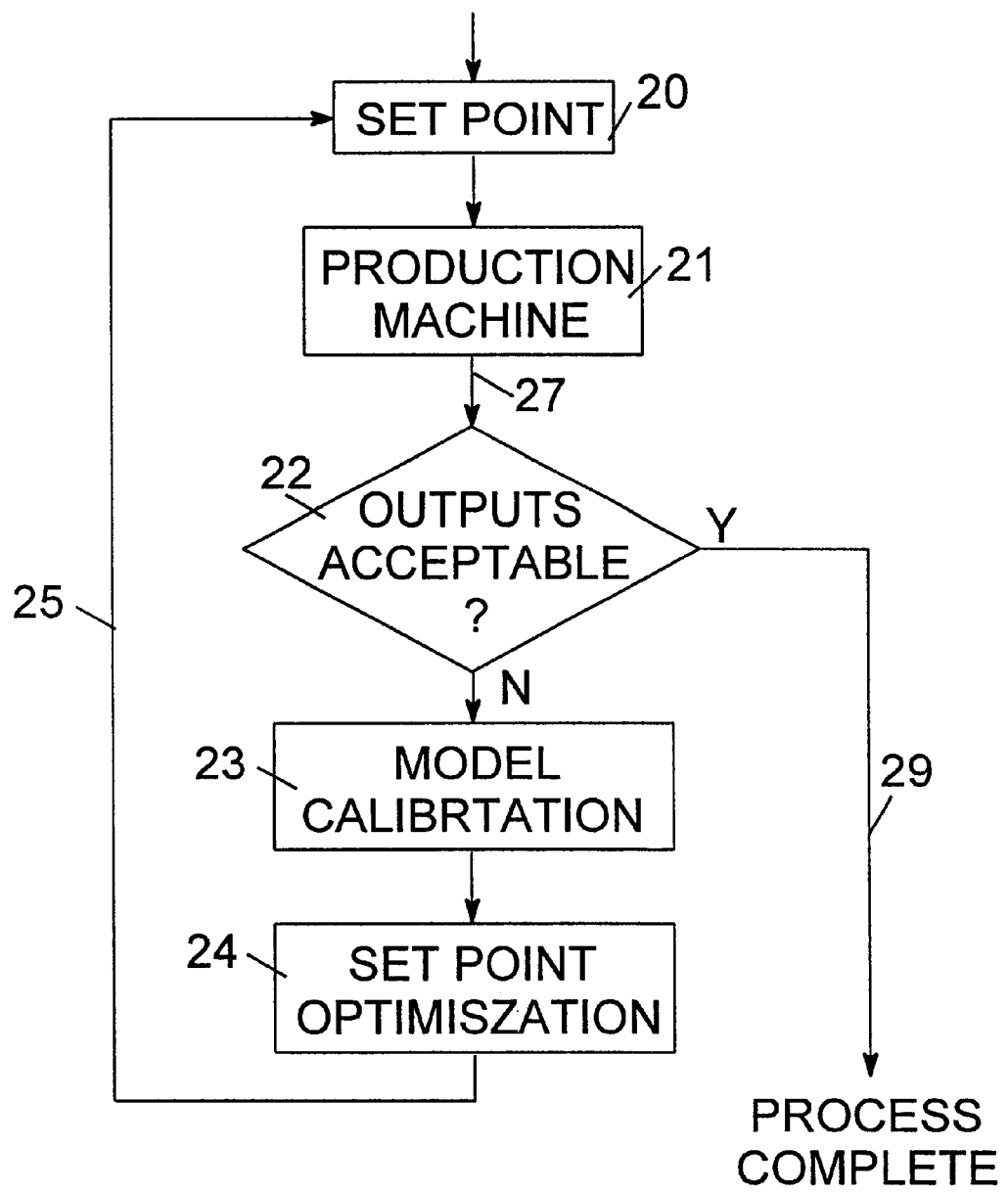
FIG. 2 is a flow chart illustrating the method of FIG. 1.

FIG. 2 is a flow chart describing the recalibrating method of the invention. In order to recalibrate the model, a set-point 20 is provided to the inputs of the production machine 21. The outputs 27 of the machine are compared in block 22 with the required characteristics of the product. If the outputs 27 are within the required ranges, the process terminates and the machine can go into production, as marked by arrow 29. If however, the outputs 27 are found to be out of the range of constraints, a new set-point must be found for which the outputs are all in the required ranges. A recalibration 23 of the model is then performed using the last set-point and the machine outputs. This results in the model being able to exactly mimic the machine in the vicinity of this set-point. Then, based on the said recalibrated model, a new set-point 20 can be provided to the inputs of the machine. However, in order for the new set-point to be an optimal one, as discussed above, a set-point optimization 24 is carried out. The optimized set-point 25 is then provided as a new set-point to the machine. The procedure is then repeated, as necessary, until receiving an acceptable output product.

Recalibrating tests with the method of the invention have shown that the procedure converges to obtain an optimal set-point very quickly. All tests to date have shown that four or fewer tests are required.

The method of the invention involves three major steps:

a. Modeling—In this step the model of the machine process is determined, along with all constants which will need calibration. The method of the invention generally assumes the existence of a previous set of model constants the accuracy of which is in question;

b. Calibration—In this step (23 in FIG. 2), the constants of the model are updated using a set point and the resulting output properties; and c. Optimization—In this step (24 in FIG. 2), a new, optimized set-point is predicted, that is best suited for obtaining the goal, and is most robust to possible variations in the inputs.

As said, the invention assumes the existence of an "original model" that first has to be updated, and then one or more new set-points have to be calculated. The invention can be carried out essentially with any type of model. For example, a mathematical-physical, first principal based model may be used in accordance with the invention. This type of model uses the canonical equations from chemistry, fluid mechanics, thermodynamics, electromagnetics, etc., in order to make predictions of process behavior and properties. The mathematical-physical models (hereinafter also referred to as the "physical models") are usually more accurate than the data based models, as the constants of the model are tied to the physics rather than raw data. Therefore, the convergence of the updating of the model is generally faster in the mathematical-physical models than in the data based models.

In the recalibration step, the constants (the k's) of the equations are updated from new machine/process data. All models have adjustable constants so that they can be tuned to a given process. Since processes, themselves, evolve as the machines age or physical conditions of the machine change, the constants must be adjusted in order to continue to be accurate. This process is called herein recalibration. As previously mentioned, in many present day processes, this requires a data set equal to or larger than the number of constants in the model, which means an expensive series of (usually) nonproductive tests need to be performed. In a few other processes, it is possible to update the constants using fewer tests.

According to the method of the present invention only one test is needed for each recalibration. Generally, the last known set-point and output product properties are used for this calibration. There is an unlimited number of ways of changing the model constants, since there are many unknowns and only one data point, all these ways are within the scope of the invention. The present invention is able to determine an optimal set of new values for all the constants with this one set-point and measured output.

Figure 3:
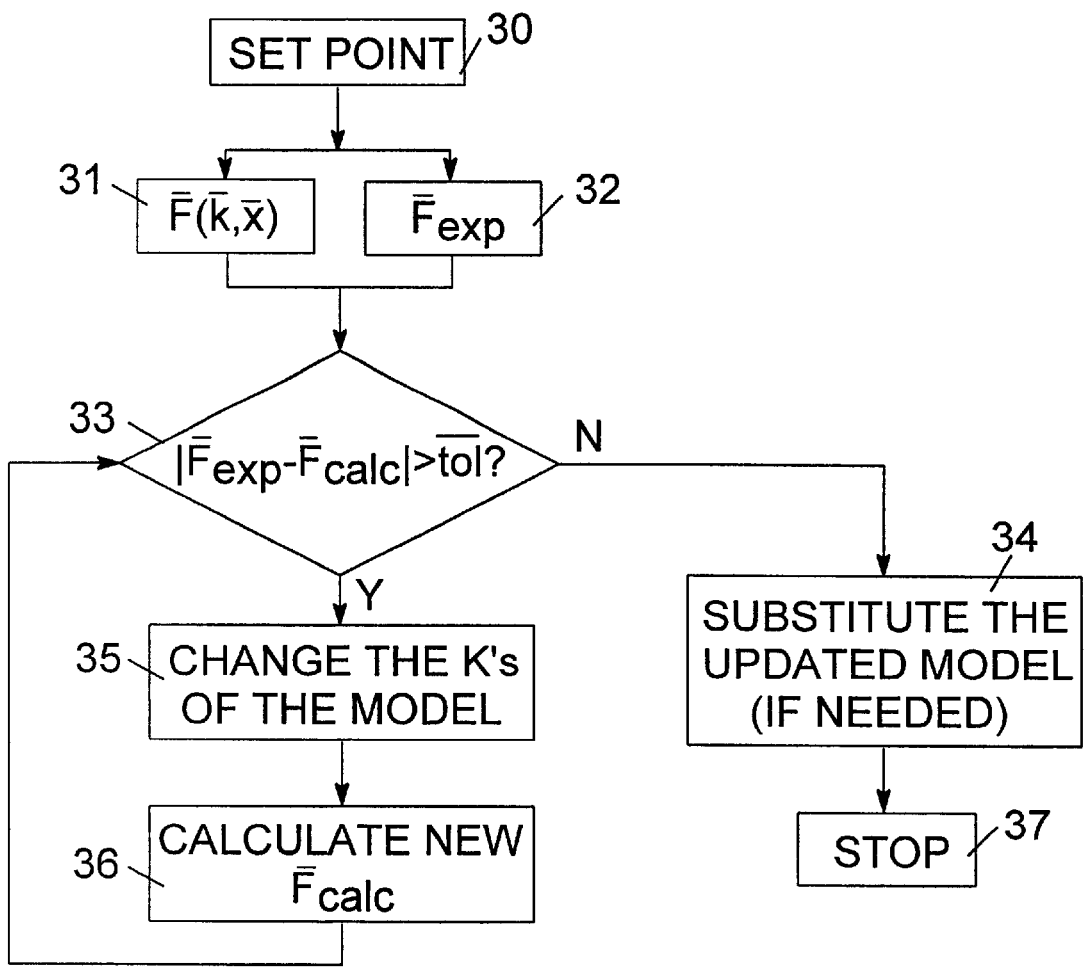
FIG. 3 is a flow chart illustrating the calibration procedure, according to one embodiment of the invention.

FIG. 3 is a flow chart explaining the recalibrating step, according to one embodiment of the invention. In this example, the existence of a model $F(\bar{k},\bar{x})$ is assumed, wherein the overbar indicates a vector. The k's are the constants to be calibrated, and the x's are the set-point to the machine (i.e., the input values). When a test is made, a set-point 30 is provided to the machine, that according to the calculations with the existing model 31 should provide the desired product within all the constraints. A product $F_{exp}(\bar{p})$ 32 is received at the output of the machine, wherein the vector $(\bar{p})$ relates to the measured characteristics of the output product. Then, in block 33 the output product $F_{exp}$ is compared with the theoretical output product $F_{calc}$, as calculated based on the assumed model 31 and set-point 30. If it is found that one or more of the characteristics $(\bar{p})$ is out of the constraints (tol.), one or more of the constants of the model are changed in block 35, and a new product $F_{calc}$ is calculated in block 36, based on the recalibrated model. The comparison is then repeated in block 33. The procedure is repeated until a set of k's to the model that provides $F_{calc}$ that satisfies all the constraints of block 33 has been found. When this set of k's is found, they are substituted into the model of the machine in block 34. After the substitution, the recalibration of the model is completed and the procedure stops at 37.

It should be noted that the effect of this recalibration at one point is to accurately model the machine behavior in the vicinity of $(\bar{x}_{exp}, F_{exp})$. Thus, this is a local calibration, meaning that the model is thus now accurate only in a neighborhood of this point. The size of this neighborhood depends on the accuracy of the model.

After the model calibration, the model is ready for finding an optimal set-point for obtaining a product with properties within the allowed ranges, and this is done by the optimization procedure.

In the optimization procedure, a new set-point is predicted from the model. Mathematically, there are an infinite number of new set-points which satisfy any requested output goal. Physically, the set is limited, because the machine settings (the x's) are available only in a finite number of increments. Still, there are usually a large number of possible new set-points for each product. The task is to choose one of these set-points which is optimal. An optimal set-point is always defined by satisfying some set of constraints better than the other possible set-points. Hence, this step depends on the set of constraints chosen. There may be different constraints that may affect the definition of an "optimal set-point", and some of the constraints may be case-specific. An example for a default set of constraints includes a combination of the following:
1. minimized set of sensitivities:
   this gives a set-point which is robust in the sense of being less sensitive to errors in the machine settings or drifts in machine performance.
2. a set-point which is close to the last set-point. This has two advantages:
   it allows for smaller changes to the machine settings; and
   it allows for faster convergence of the overall process.
3. a set-point which is as close to the center of the allowable ranges as possible:
   this allows maximum flexibility for the operator to make any subsequent changes to machine settings without being immediately concerned with moving an input parameter out of range.

As said, many other constraints are possible and can easily be built into the method of the invention.

There are many ways to perform the optimization step. One example is given by the following algorithm:
1. Determine all possible set-points within the allowable ranges of the input variables. This is a simple calculation using the allowable ranges of the input parameters and the minimum control increment possible for each parameter. This is the parameter space domain of the function.
2. Evaluate the model for each possible set-point in the domain and find all set-points which satisfy the acceptable output range criteria.
3. Apply the constraint criteria as given above to this set in order to find an optimal set-point.

Having found an optimal set-point, the machine is operated at these settings and the outputs are measured to check adherence to the goal. If the goal is not met, then, the process of calibration and optimization is repeated with the new data. Note that the new set-point should lead to an output closer to the goal than the previously predicted set-point. The process converges after a very small number of such iterations. The number of iterations again depends on the accuracy of the model. However, as said above, the number of iterations of the process in order to recalibrate the model and to obtain an optimal set-point is very small, and rarely more than three tests are needed.

As said, the process of the present invention provides means for obtaining one set-point and recalibrating the model in the vicinity of said set-point and output goal. However, if a need arises to work in any other specific output goal region, even one remote from that to which the model is calibrated, the same procedure may be used starting with a set-point in the vicinity of the first output goal region. Furthermore, the method of the invention may be implemented by a controller, for providing an efficient tracking and optimizing of new set-points, to correct for changes in machine characteristics. The controller may operate in an open-loop or in a closed loop mode.

EXAMPLE

In a typical Chemical Vapor Deposition (CVD) process machine, a number of settings are required to deposit a layer of $SiO_2$ on the surface of a silicon wafer for the purpose of making chips. The layer must have certain properties which are dependent on the machine settings. A central problem with such a machine is the apparent drift in layer properties with time for the settings, and particularly after the machine has been opened for maintenance. In order to determine the machine settings for production range layer properties, a number of non-production experiments are usually performed. It is a typical operation, then, for the machine operator to look at the results of one set of machine settings and try to determine the next settings to get the process back into the production ranges. These experiments are costly and add to machine lifecycle time without producing useful results. In short, the Cost of Ownership (COO) is directly increased by the number of experiments that are performed. It is thus very desirable to minimize the number of these experiments.

The method of the invention is designed to address this difficulty. A typical machine may have 5 input variables. Present Design of Experiments (DOE) analyses require that a minimum of 16 experiments be performed in order to characterize the machine operating domain. This number of experiments must be performed as often as is necessary in order to keep up with gradual changes in the machine operating characteristics. In contrast, the method of the invention requires only an initial set of experimental points which can be obtained from any suitably recorded data from the machine history. After that, fewer than 4 experiments are required anytime in the machine lifetime. Thus, there is a very large reduction in the number of experiments required by the procedure of the invention.

Furthermore, the prior art approaches require the 16 experiments to be performed on every machine of the same type with the same process, whereas the method of the invention only requires the initial information from one machine. In this sense, the data from that machine is now transferable to other machines.

The approach is carried out in several steps:

Preliminary Step—Produce a Model of the Process

This part consists of finding a mathematical description of the machine process. In the case of a physical model, for example, then this step consists of formulating from the governing equations of fluid mechanics, chemistry, plasmas, and whatever other physical process may be present, a model of the process. This model is to be as exact as necessary. Normally, there are still some undetermined constants in the equations which must be calibrated. Initial values of these quantities usually come from the open literature and from previous data from the CVD machine. These will be simply updated with very little input. This will become part of the overall process.

The end of this step is reached when the model has been constructed, at which point it becomes a module in the methodology of the invention that is carried into practice by means of software. Once this is done, the software is ready to be applied to machines which perform the CVD process. It should be noted that for some other process, a different model would be used, but the following methodology and procedure would be the same.

Operation of the Software

Now the procedure is ready to begin. The software is loaded onto any PC in the vicinity of the CVD machine and the program starts.

Step 1

An existing machine set-point and output results are entered into the software. The desired machine outputs for the layer and the acceptable ranges of the input and output parameters are also entered into the software. If the machine set-point already results in all production ranges being met, there is no need to proceed further. However, if that is not the case, then the software proceeds to the next step.

Step 2

Recalibrate the model constants based on the one machine set-point and output product properties. This means finding new values for all the constants with only one equation. There are an infinite number of possible combinations of changes which will satisfy this criteria. It should be noted that having performed this step, the model will now exactly mimic the machine at all set-points in the neighborhood of this set-point. The size of this neighborhood depends on the accuracy of the model (which is why a physics-based model is desirable), and on how well the calibration is performed. The larger the neighborhood, the faster the overall process converges.

Note: This calibration step is unique. Most recalibration procedures use at least as many data points as there are constants in the model. At least for CVD processes, this would require performing many experiments. As said, the software carrying out the method of the invention requires only one.

Step 3

Predict a new set-point which will satisfy the production range criteria for the machine outputs. Like the calibration step, there will be more than one solution. That is, there will be more than one set-point which will produce the desired machine outputs. In order to properly optimize the process, all these set-points need to be found. The software carrying out the method of the invention finds all the set-points which will result in production range outputs, and then chooses one which is optimal, according to a user selectable set of constraints.

Step 4

Run the machine at the predicted set-point and obtain the new machine outputs. If the new machine outputs are in the production range, then the procedure is done. If not, then return to Step 1 and repeat the procedure.

Example from a Real CVD Machine

In this case, the machine is the one described above. The machine set-points include values for the chamber pressure, the wafer temperature, the spacing between the wafer and the 'showerhead' (the gas inlet), the flow rates of the input gases, and the time of surface deposition.

In this example, the desired output, a layer of 10,000 Angstrom in thickness, is significantly different from the initial 12,899 Angstroms. Here the initial settings were:

| | |
|---|---|
| pressure | p1 |
| power | pwr1 |
| Spacing | Sp1 |
| TEOS Flow Rate | Ft1 |
| Oxygen Flow Rate | FO1 |
| Helium Flow Rate | FH1 |
| Wafer Temperature | Tw1 |
| Time | T1 |
| Measured Thickness | 12899 Angstroms |

The software, with calibration, predicted the following set-point:

| | |
|---|---|
| pressure | p2 |
| power | pwr2 |
| Spacing | Sp2 |
| TEOS Flow Rate | Ft2 |
| Oxygen Flow Rate | FO2 |
| Helium Flow Rate | FH2 |
| Wafer Temperature | Tw2 |
| Time | T2 |
| Measured thickness | 10564 Angstroms |

Which was sufficiently close that it was known that reducing the deposition time by a few seconds (still in the allowable time range) would result in a production range thickness.

It should be noted that the deposition of $SiO_2$ on a silicon wafer is only one of several hundred different processes in the CVD industry. The approach of the invention is applicable to virtually all of these processes, and is equally applicable to a broad range of processes outside the CVD industry, as well.

While some embodiments of the invention have been described by way of illustration, it will be apparent that the invention can be carried into practice with many modifications, variations and adaptations, and with the use of numerous equivalents or alternative solutions that are within the scope of persons skilled in the art, without departing from the spirit of the invention or exceeding the scope of the claims.

What is claimed is:

1. A method for optimizing a machine set-point utilizing a machine model which predicts the properties of the output product of the machine, while the machine operation is solely dedicated to the method for optimizing the machine set-point and is not operating for production, comprising:
   a. defining allowed ranges for the properties of the output product, the ranges of the possible machine set-points and optimal set-point criteria;
   b. carrying out calibration of the model of the machine for finding updated constants for the machine model;
   c. using the updated constants in the machine model, finding all set-points that will provide a product whose properties are within the allowed ranges;
   d. carrying out an optimization procedure to find from all the set-points found in step c, one optimized set-point;
   e. operating the machine at the optimized set-point found in step d, and obtaining a new output product;
   f. comparing the properties of the new output product to the allowed ranges;
   g. if the properties of the output product are within allowed ranges, the new set-point is found, and the procedure is successfully finished;
   h. if the properties of the output product are out of said allowed ranges, repeating the procedure from step b.

2. A method according to claim 1, wherein the calibration of the model comprises:
   a. taking the known model;
   b. substituting for the variables of the known model the latest set-point;
   c. predicting the values of the output properties;
   d. comparing the predicted output properties to the properties of the output product from the machine;
   e. updating the constants of the model to reduce the difference between predicted and measured properties to a negligible level.

3. A method according to claim 1, wherein the calibration of the model comprises:
   a. taking the known model;
   b. providing to the machine an input set-point as calculated from the known model of the machine, for producing the goal product, and receiving an output product;
   c. substituting for the variables of the known model the latest set-point;
   d. predicting the values of the output properties;
   e. comparing the predicted output properties to the properties of the output product from the machine;
   f. updating the constants of the model to reduce the difference between predicted and measured properties to a negligible level.

4. A method according to claim 1, wherein the optimization procedure comprises:
 a. taking the calibrated model;
 b. finding all set-points within the ranges of the possible machine set-points that, when substituted for the variables of the calibrated model, result in a product whose properties are predicted to be within allowed ranges for the properties of the output product;
 c. from all the set-points-found in step b, finding the optimal one, according to a defined set-point criteria.

5. A method according to claim 1 wherein the optimal set-point criteria is selected from the following:
 a. most robust set-point that will provide an output product whose variations with respect to errors in machine settings is minimal;
 b. a set-point that is closest to the one used for updating the constants in step b;
 c. a set-point whose values are closest to the center of the ranges of the possible machine set-points as defined in step 1a.

6. A method according to claim 1, for optimizing machine set-points in a group of machines and processes of the same type, comprising:
 a. finding a new set-point for a first machine in the group, according to the procedure of claim 1;
 b. substituting for the variables of the known model the new set-point as found in step a, as the latest set-point for any other machine in the group.

7. A method according to claim 1 used for an efficient tracking and optimizing of new set-points, to correct for changes in machine characteristics.

8. A method according to claim 1, for predicting a new set-point for any change in the output properties of a product, wherein a latest set-point and one set of the previous product output properties obtained by operating the machine in said latest set-point, is used for obtaining a new set-point.

9. A method according to claim 1 wherein the model is a physical model.

10. A method according to claim 1 wherein the model is a data based model.

11. A method according to claim 1 wherein the model is a combination of a physical model and a data based model.

12. A controller for carrying out the method of claim 1, used for an efficient tracking and optimizing of new set-points, to correct for changes in machine characteristics.

13. A controller according to claim 12, operating in an open-loop mode.

14. A controller according to claim 12, operating in a closed-loop mode.

\* \* \* \* \*